United States Patent
Iguchi et al.

(10) Patent No.: US 7,464,047 B1
(45) Date of Patent: Dec. 9, 2008

(54) METHOD OF PROCESSING CUSTOMER'S ORDERS AND A CUSTOMER'S ORDER PROCESSING APPARATUS

(75) Inventors: Kesayoshi Iguchi, Fujisawa (JP); Hiroyuki Tanaka, Yokohama (JP); Tomoyo Inui, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 723 days.

(21) Appl. No.: 09/488,527

(22) Filed: Jan. 21, 2000

(30) Foreign Application Priority Data

Jan. 28, 1999 (JP) ............................. 11-020484

(51) Int. Cl.
*G06F 17/30* (2006.01)
(52) U.S. Cl. .................. 705/10; 705/15; 705/16
(58) Field of Classification Search .............. 705/9, 705/10, 15, 16
See application file for complete search history.

(56) References Cited

U.S. PATENT DOCUMENTS

| | | | | |
|---|---|---|---|---|
| 4,797,818 A | * | 1/1989 | Cotter | 705/15 |
| 4,922,435 A | * | 5/1990 | Cahlander et al. | 364/513 |
| 5,132,914 A | * | 7/1992 | Cahlander et al. | 700/211 |
| 5,172,328 A | * | 12/1992 | Cahlander et al. | 700/211 |
| 6,026,372 A | * | 2/2000 | Savage | 705/15 |
| 6,102,162 A | * | 8/2000 | Teicher | 186/39 |
| 6,298,331 B1 | * | 10/2001 | Walker et al. | 705/15 |
| 6,301,564 B1 | * | 10/2001 | Halverson | 705/15 |

OTHER PUBLICATIONS

Masao, Kikuchi, Order Data Input System and Storage Medium,, Pub. No. 11-272743 [JP 11272743 A], Oct. 8, 1999, 1 page.*

* cited by examiner

*Primary Examiner*—Andrew Joseph Rudy
(74) *Attorney, Agent, or Firm*—Louis Woo

(57) ABSTRACT

In a customer's order processing apparatus and method, the CPU stores setting data for every article, inputs and stores order data of ordered articles, predicts quantities of the ordered articles in response to a command signal, and displays the quantities every the articles in accordance with the setting data in response to the command signal, so that at the slow time zone, each set of orders are displayed independently in order of time and at the peak time zone, the target number of articles to be prepared are displayed. The command signal for effecting the peak time condition display is generated according to the present time and the peak time zone start time and end time which were inputted or stored. Moreover, the peak time zone start time and end time may be detected according to the number of customers. Moreover, the command signal may be further generated in response to a key switch or a rotary switch. The peak time zone data may be switched between weekdays and holidays. The peak time condition may be judged according to the number of customers. The command signal may be transmitted from the cash register and received by a video controller to effect the peak time zone display operation. The command signal may be generated in accordance with the number of detected customers or the number of the pending orders.

16 Claims, 17 Drawing Sheets

FIG. 2

| ARTICLE NAME | PEAK TIME ZONE CONT CODE |
|---|---|
| HAMBURGER | 1 |
| BIGBURGER | 0 |
| CHEESEBURGER | 1 |
| TERIYAKI | 1 |
| S FRY | 1 |
| M FRY | 1 |
| L FRY | 1 |
| S NUGGET | 0 |
| M NUGGET | 0 |
| L NUGGET | 0 |

FIG. 3

| #0103<br>2 HAMBURGER<br>2 CHEESEBURGER<br>1 L FRY | #0104<br>2 M NUGGET<br>1 S FRY<br>2 CHEESEBURGER<br>1 HAMBURGER | #0105<br>1 HAMBURGER<br>1 BIGBURGER<br>1 M FRY<br>1 S NUGGET | |
|---|---|---|---|

SLOW TIME ZONE DISP IMAGE

FIG. 4

|  | Q-5 | Q-10 |
|---|---|---|
| HAMBURGER | 1 | 2 |
| CHEESEBURGER | 1 | 1 |
| TERIYAKI | 0 | 2 |
| S FRY | 0 | 1 |
| M FRY | 1 | 2 |
| L FRY | 0 | 1 |

FIG. 6

| | | 61 |
|---|---|---|
| PEAK TIME ZONE START TIME | 11:00 | |
| PEAK TIME ZONE END TIME | 14:00 | |

PEAK TIME ZONE SETTING TBL  62

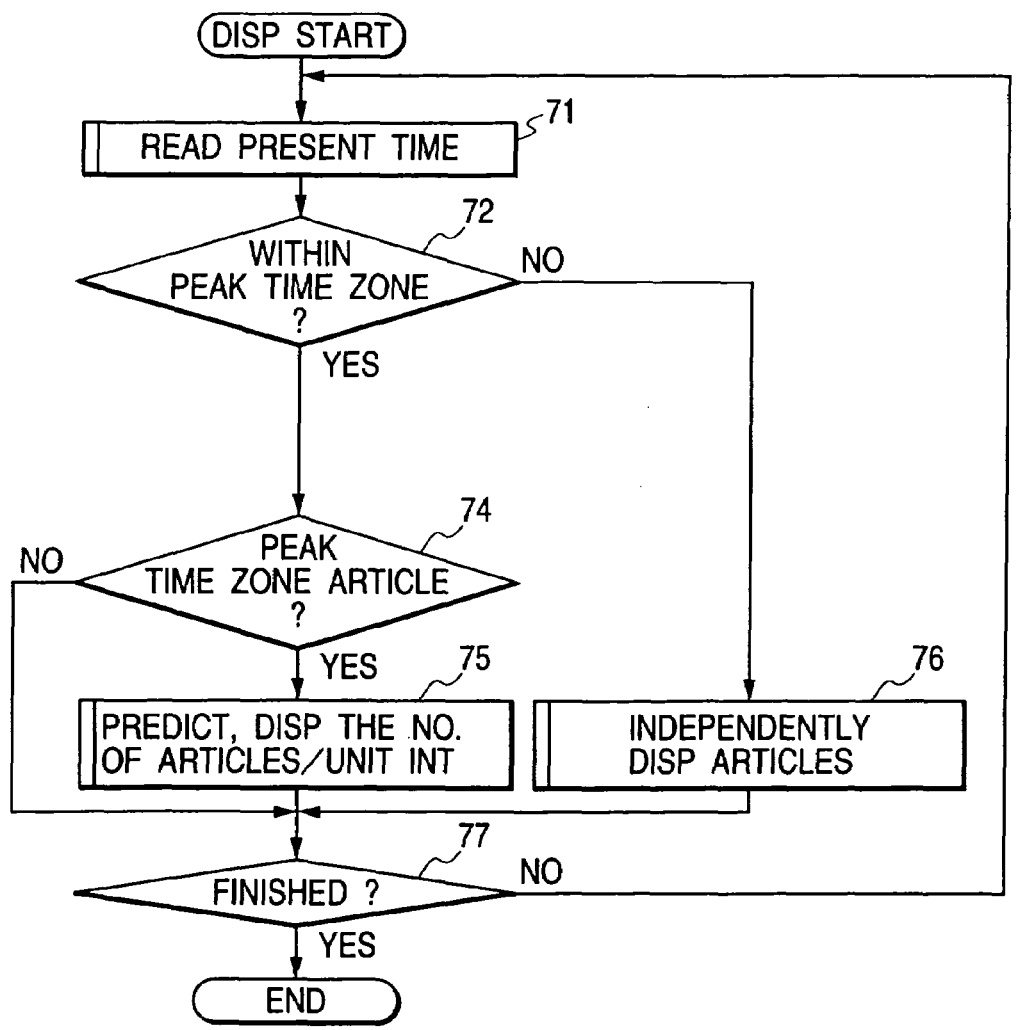

| PEAK TIME REF NO. (R) | 150 |
|---|---|
| PRIDICTED PEAK TIME ZONE | 11:00～14:30 |

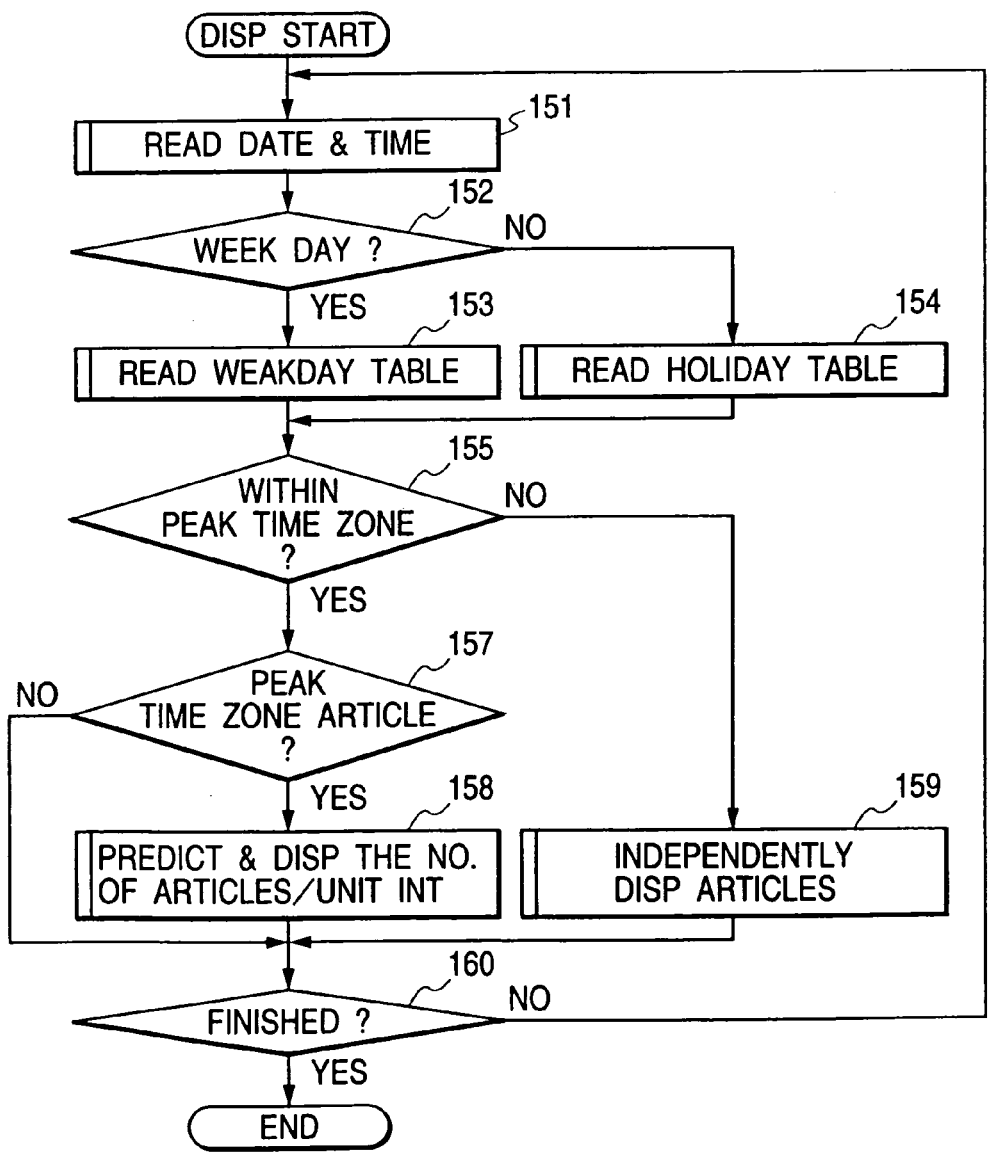

| REF NO. OF CUSTOMERS | 150 |
|---|---|

FIG. 19A
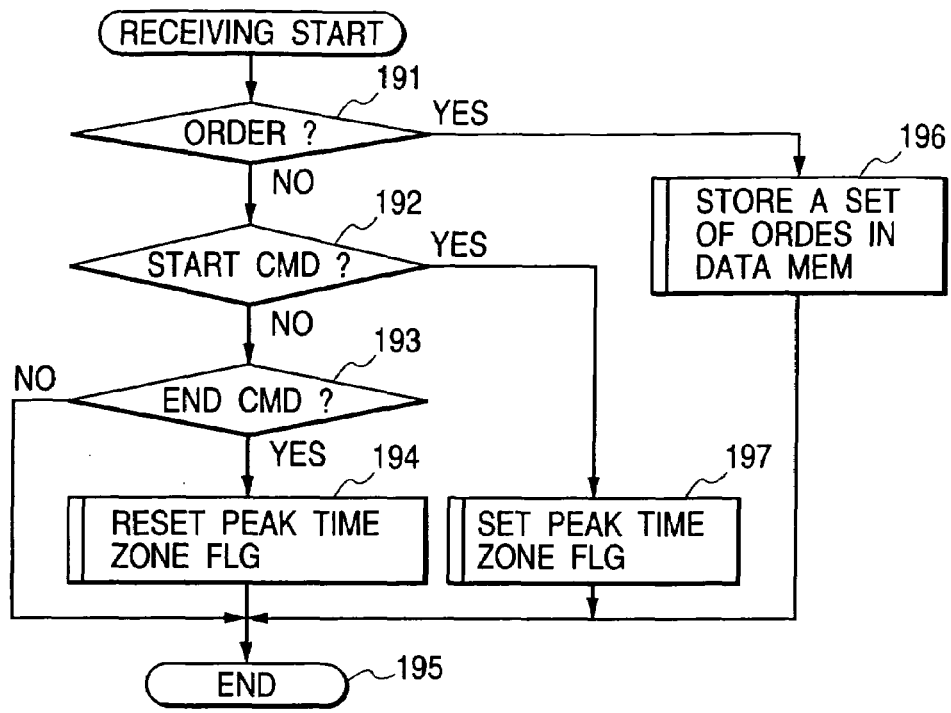
FIG. 19B
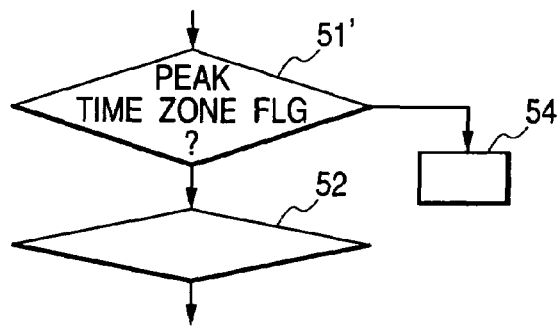
FIG. 20
| THE NO. OF PENDING ORDERS | 10 |
|---|---|

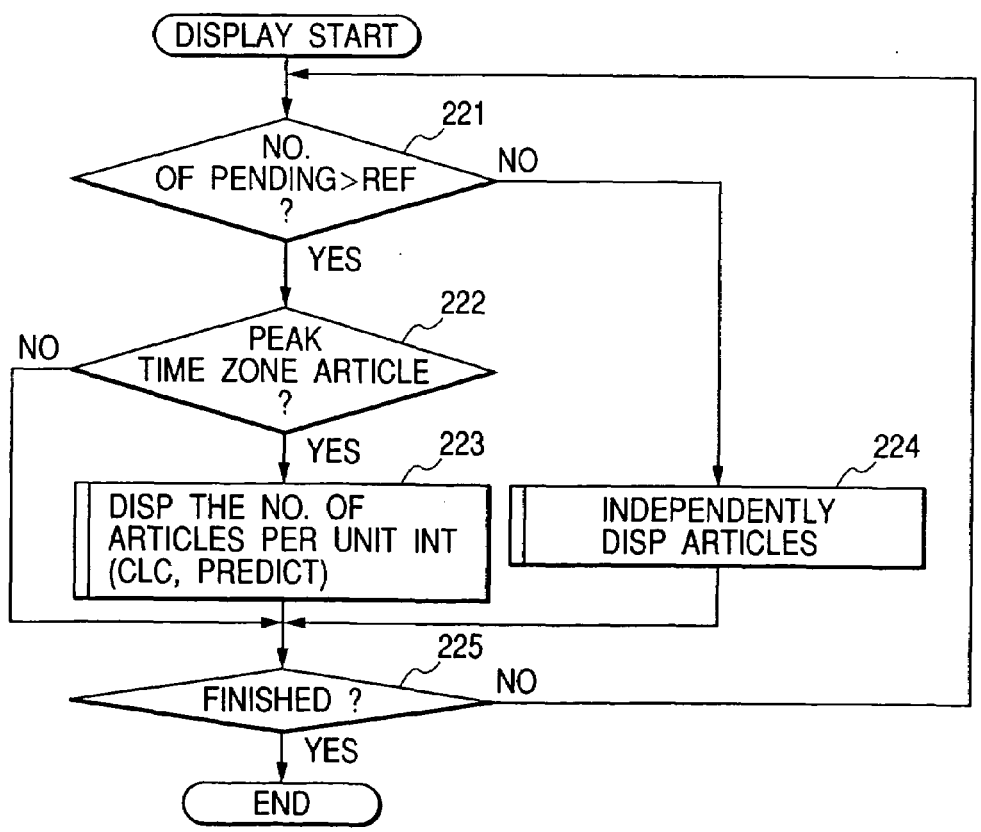

| HAMBURGER | CHEESE-BURGER | TERIYAKI | 7 | 8 | 9 | SUB-TOTAL |
|---|---|---|---|---|---|---|
| S FRIED POTATO | M FRIED POTATO | L FRIED POTATO | 4 | 5 | 6 | |
| COFFEE | COLA | TEA | 1 | 2 | 3 | TOTAL |
| S NUGGET | M NUGGET | L NUGGET | 0 | 00 | | |

| HOLDING (261) | ROTATING (262) |
|---|---|
| SERVER (263) ||

FIG. 27
PRIOR ART

| #0103 (271) | #0104 (272) | #0105 (273) | |
|---|---|---|---|
| 2 HAMBURGER | 2 NUGGET | 1 HAMBURGER | |
| 2 CHEESEBURGER | 1 S FRY | 1 CHEESEBURGER | |
| 1 L FRY | 2 CHEESEBURGER | 1 M FRY | |
| 3 TEA | 1 HAMBURGER | 1 COLA | |
|  | 2 COLA |  | |

FIG. 28
PRIOR ART

| #0104 | #0105 | | |
|---|---|---|---|
| 2 NUGGET | 1 HAMBURGER | | |
| 1 S FRY | 1 CHEESEBURGER | | |
| 2 CHEESEBURGER | 1 M FRY | | |
| 1 HAMBURGER | 1 COLA | | |
| 2 COLA | | | |

METHOD OF PROCESSING CUSTOMER'S ORDERS AND A CUSTOMER'S ORDER PROCESSING APPARATUS

BACKGROUND OF THE INVENTION

1. Field of the Invention

This invention relates to a method of processing customer's orders and a customer's order processing apparatus. More specifically, this invention relates to a method of processing customer's orders with displaying orders at a kitchen.

2. Description of the Prior Art

A customer's order processing apparatus is known. In this prior art customer's order processing apparatus, customer's orders are transmitted to a kitchen to display the orders to prepare the ordered dishes. FIG. 23 is a block diagram of a prior art customer's order processing apparatus. The prior art customer's order processing apparatus includes electronic cash registers (ECR) 231, a communication path 232, a kitchen video controller (KVC) 233, a display monitor 234, and a monitor switch 235.

FIG. 24 is an illustration of a keyboard of the cash register 231 of the prior art customer's order processing apparatus. The keyboard includes article keys 241, numeric keys 242, a subtotal key 243, and a total key 244.

FIG. 25 depicts a flow chart of the prior art customer's order processing apparatus showing example operation of inputting orders. An operator successively operates the article keys 241 to input article data of a hamburger, a cheeseburger, a medium size package of fried potato, a cola in steps s1 to s3, for example, and operates the subtotal key 243 and the total key 244 as the operator is hearing the orders by the customer.

FIG. 26 is an illustration of a monitor switch 235 of the prior art customer's order processing apparatus. The monitor switch 235 includes a holding key 261, a rotating key 262, and a served key 263.

FIG. 27 is an illustration of the prior art customer's order processing apparatus showing example images of customer's orders. The customers orders are displayed on the display monitor 234 in order of time. Display image 271 represents two-set-prior orders, display image 272 represents one-set-prior orders, and display image 273 represents the present orders. FIG. 28 is an illustration of the prior art customer's order processing apparatus showing another example images of customer's orders. In FIG. 28, the oldest set of the orders in FIG. 27 has been erased.

In the prior art customer's order processing apparatus at a restaurant or the like, article data is registered with the electronic cash register 231. The article data is transmitted to the kitchen video controller 233 through the communication path 232. The kitchen video controller 233 displays the article data received from the electronic cash register 231 on the display monitor 234 as shown in FIG. 27. The cooks prepare articles with monitoring the display monitor 234. When a cook has finished preparing the articles, the cook depresses the monitor switch 235 to erase the display image of the corresponding set of orders.

Generally, in the electronic cash register 231, the names of articles are set on the keyboard of the electronic cash register 231 as shown in FIG. 24, so that ordering processing can be performed only by depressing the keys in accordance with the orders by a customer. For example, when an operator receives orders of a hamburger, a cheeseburger, a medium size of fried potato, and a cola, as shown in FIG. 25, the operator successively depresses the article keys 241 to input article data of a hamburger, a cheeseburger, a medium size package of fried potato, a cola in steps s1 to s3, and operates the subtotal key 243 in step s4, and the total key 244 in step s5, as the operator is hearing the orders by the customer. If the ordering has finished, the operator depresses the subtotal key 243. Then, a total amount is displayed and the operator announces the total amount. Then, the operator receives the payment and depresses the total key 244 for accounting processing. Then, the counting processing has finished and a receipt is provided to the customer.

The kitchen video controller 233 operates the 5 display monitor 234 at the kitchen to display sets of orders in order of time to cooks, wherein, as shown in FIG. 27, the first set of order 271 is displayed at the leftmost of the screen of the display monitor 234, the second set of order 272 is displayed on the right of the first order 271, and the last set of order 273 is display on the right of the second set of order 272. The number "#0103" represents the order number. For example, "#0103" represents the third set of orders in the electronic cash register 231 having the machine number one. If the first set of orders 271 are received as shown in FIG. 25, the display monitor 234 successively displays two "hamburgers", two "cheeseburgers", one "L size package of fried potato", and three cups of "tea". Cooks in the kitchen prepare the corresponding articles with monitoring the display monitor 234. When cooking has finished, the cook erases the display image of the corresponding set of orders on the display monitor 234.

The holding key 261 of the monitor switch 235 is a stacking key for shifting the display image of one set of orders to another place on the screen of the display monitor 234 when it will take for a long time period to prepare the corresponding articles.

The rotating key 262 of the monitor switch 235 is a key for swapping the display image of one set of order with the next order on the screen of the display monitor 234 when the preparing order is changed. The served key 263 is a key for erasing the data of order and erasing the display image of the order. When the served key 263 is depressed, the display image is changed as shown in FIG. 28 from the image shown in FIG. 27.

SUMMARY OF THE INVENTION

The aim of the present invention is to provide a superior method of processing customer's orders and a superior customer's order processing apparatus.

According to the present invention there is provided a first method of processing customer's orders including the steps of (a) storing setting data for every article; (b) inputting ordered articles and storing order data of the ordered articles; (c) predicting quantities of the articles to be prepared in accordance with the stored order data in response to a command signal; and (d) displaying the quantities every the articles in accordance with the setting data in response to the command signal.

In the first method, the step (a) may further include the step of inputting the setting data every article so as to be stored.

The first method may further include the steps of: (e) storing peak time zone data; (f) detecting the present time; and (g) judging whether the present time is within a peak time zone in accordance with the stored peak time zone data to generate the command signal, as a second method.

In this case, the step of storing peak time zone data may further include the step of inputting the peak time zone data, as a third method.

In the first method may further include the step of: providing a push switch responsive to an operator for generating the command signal.

The first method may further include the step of: providing a rotary switch for generating the command signal.

A second method may further include the steps of: storing a predetermined number; detecting the number of customers from the order data; and predicting the peak time zone in accordance with the predetermined number and the detected number of customers in accordance with the predicted peak time zone to generate the peak time zone data so as to be stored in step (e). In this case, the step of storing the predetermined number further comprising the step of inputting and storing the predetermined number.

In the second method, in the step (e), weekday peak time zone data and holiday peak time zone data is stored as the peak time zone data. The second method may further include the steps of: detecting the present date; and judging whether the present date is a weekday or a holiday, wherein in step (g), the command signal is generated in accordance with the stored weekday peak time zone data, the stored holiday peak time zone, the present time, and the present date.

In this case, the step (e) further include the step of inputting the weekday peak time zone data and holiday peak time zone data so as to be stored.

The first method may further include the steps of: storing a reference number; detecting the number of customers; and judging whether it is in a peak time condition in accordance with the reference number and the detected number of customers to generate the command signal when the detected number of customers exceeds the predetermined number.

The first method may further include the steps of: transmitting the command; receiving the command to generate the command signal.

In this case, this method may further include steps of: inputting the command so as to be transmitted.

The first method may further include the steps of: storing predetermined number; detecting the number of the ordered articles in a pending condition in response to the order data and a prepared command signal; and judging whether it is in a peak time condition in accordance with the predetermined number and the detected number of the ordered articles in the pending condition to generate the command signal when the detected number of the ordered articles in the pending condition exceeds the predetermined number.

In this case, the step of storing the predetermined number may further include the step of inputting the predetermined number.

According to this invention, a fourth method of processing customer's orders is provided which includes the steps of: (a) inputting and storing data of articles in accordance with orders by customers; (b) predicting quantities of the ordered articles to be prepared in accordance with the stored data of the articles in response to a command signal; and (d) displaying the quantities every the articles in accordance with the setting data in response to the command signal.

According to this invention, a customer's order processing apparatus is provided. The customer's order processing apparatus includes: a table for storing setting data every article; an inputting circuit for inputting ordered articles and storing order data of the ordered articles; a predicting portion for predicting quantities of the articles to be prepared in accordance with the stored order data in response to a command signal; and a display for displaying the quantities every the articles in accordance with the setting data in response to the command signal.

BRIEF DESCRIPTION OF THE DRAWINGS

The object and features of the present invention will become more readily apparent from the following detailed description taken in connection with the accompanying drawings in which:

FIG. 2 is an article setting table of this invention showing relations between article names and peak time zone control codes;

FIG. 3 is an illustration of this invention showing an image of sets of orders on the display at a slow time zone;

FIG. 4 is an illustration of this invention showing an image of a list of articles to be prepared per a unit interval on the display at a peak time zone;

FIG. 6 is a table of a second embodiment showing a table for storing a peak time zone start time and a peak time zone end time;

FIG. 7 depicts a flow chart of the second embodiment showing displaying operation;

FIG. 14 is an illustration of a sixth embodiment showing a weekday peak time zone table and a holiday peak time zone table;

FIG. 15 depicts a flow chart of the sixth embodiment showing displaying operation;

FIG. 19A depicts a flow chart of the eighth embodiment showing receiving operation of the video controller;

FIG. 19B depicts a flow chart of the eighth embodiment showing a step to be replaced with the corresponding step in FIG. 5;

FIG. 20 is an illustration of a ninth embodiment showing a table for storing the number of orders in a pending condition in the peak time zone condition;

FIG. 21 is an illustration of the ninth embodiment showing the display image in the slow condition;

FIG. 22 depicts a flow chart of the ninth embodiment showing displaying operation;

FIG. 26 is an illustration of a monitor switch of the prior art customer's order processing apparatus;

FIG. 27 is an illustration of the prior art customer's order processing apparatus showing example images of customer's orders; and FIG. 28 is an illustration of the prior art customer's order processing apparatus showing another example images of customer's orders.

The same or corresponding elements or parts are designated with like references throughout the drawings.

DETAILED DESCRIPTION OF THE INVENTION

In the method of processing customer's order, it is sufficient to independently display a set of order for every customer when it is in a slow condition, that is, there are a small number of customers at the restaurant. However, when it is a peak time zone, that is, there are many customers in the restaurant, if articles are prepared for every customer, the efficiency is relatively low because the same articles are prepared independently. On the other hand, if a cook tried to combine plural orders to prepare the same articles, this is a load on the cook to know how many articles are to be prepared. Moreover, if articles have been previously prepared with forecast, there is the possibility that cool articles may be served. Accordingly, in this invention, the displayed image is changed between a slow condition and a peak time zone condition. At a peak time zone or in a peak time condition, the predicted number of articles per unit time interval is calculated and displayed.

Figure 1A:
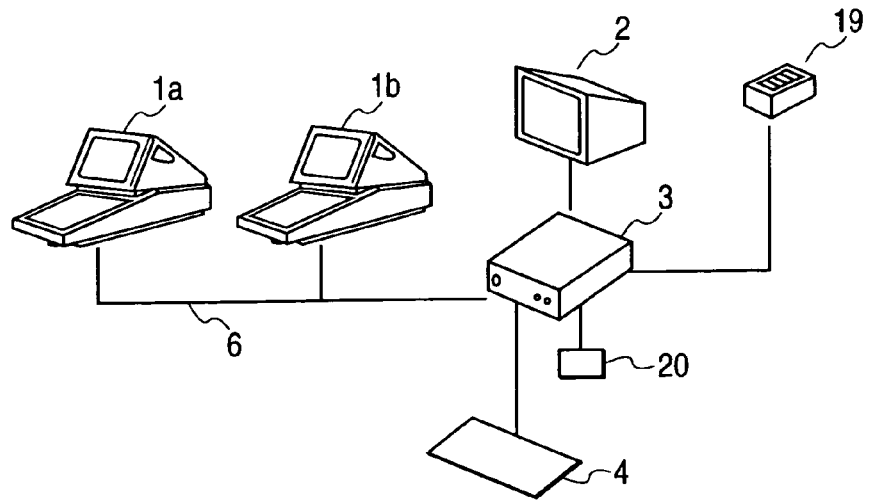
FIG. 1A is a block diagram of a customer's order processing apparatus of this invention.
Figure 1B:
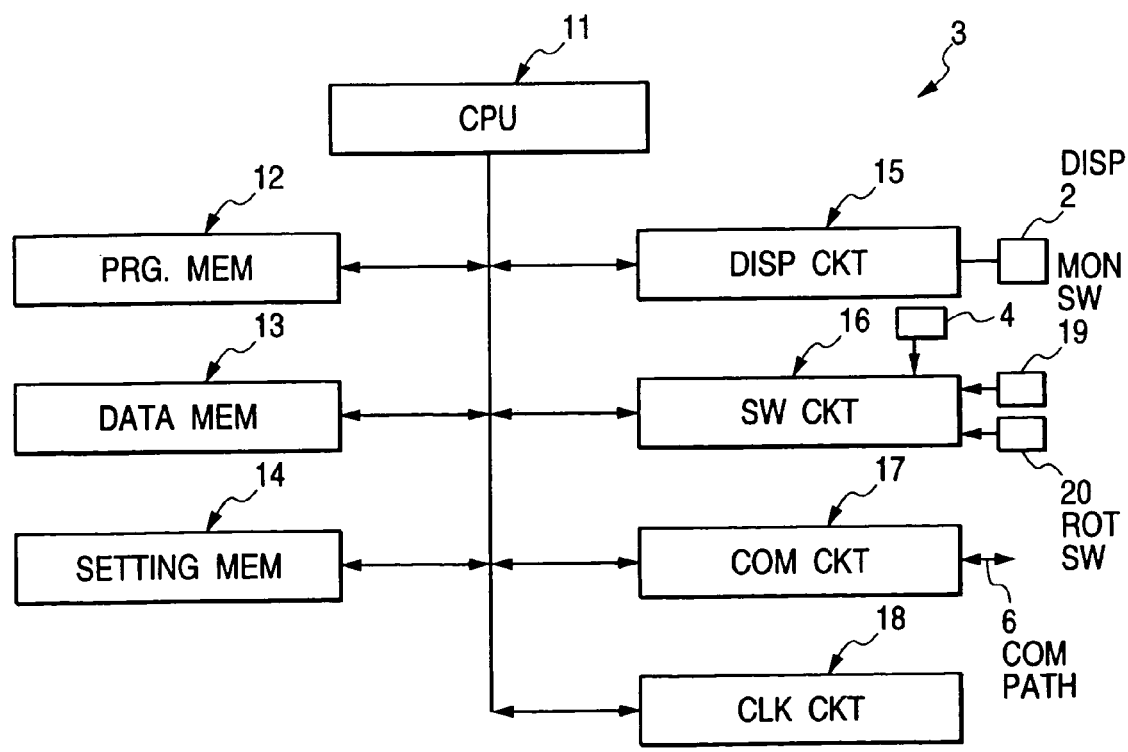
FIG. 1B is a block diagram of a kitchen display controller shown in FIG. 1A of this invention.

FIG. 1A is a block diagram of a customer's order processing apparatus of this invention. FIG. 1B is a block diagram of a kitchen display controller shown in FIG. 1A of this invention.

FIRST EMBODIMENT

As shown in FIG. 1A, the customer's order processing apparatus includes electronic cash registers (ECR) 1a and 1b, a communication path 6, a kitchen video controller (KVC) 3, a display monitor 2, a monitor switch 19, a rotary switch 20, and a keyboard 4.

Figures 23, 24:
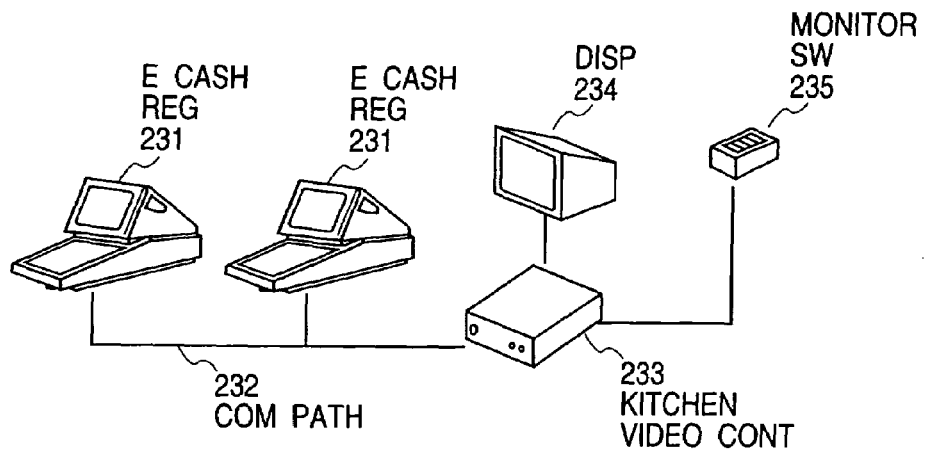
FIG. 23 is a block diagram of a prior art customer's order processing apparatus.
FIG. 24 is an illustration of a keyboard of the electronic cash register of the prior art customer's order processing apparatus.
Figure 25:
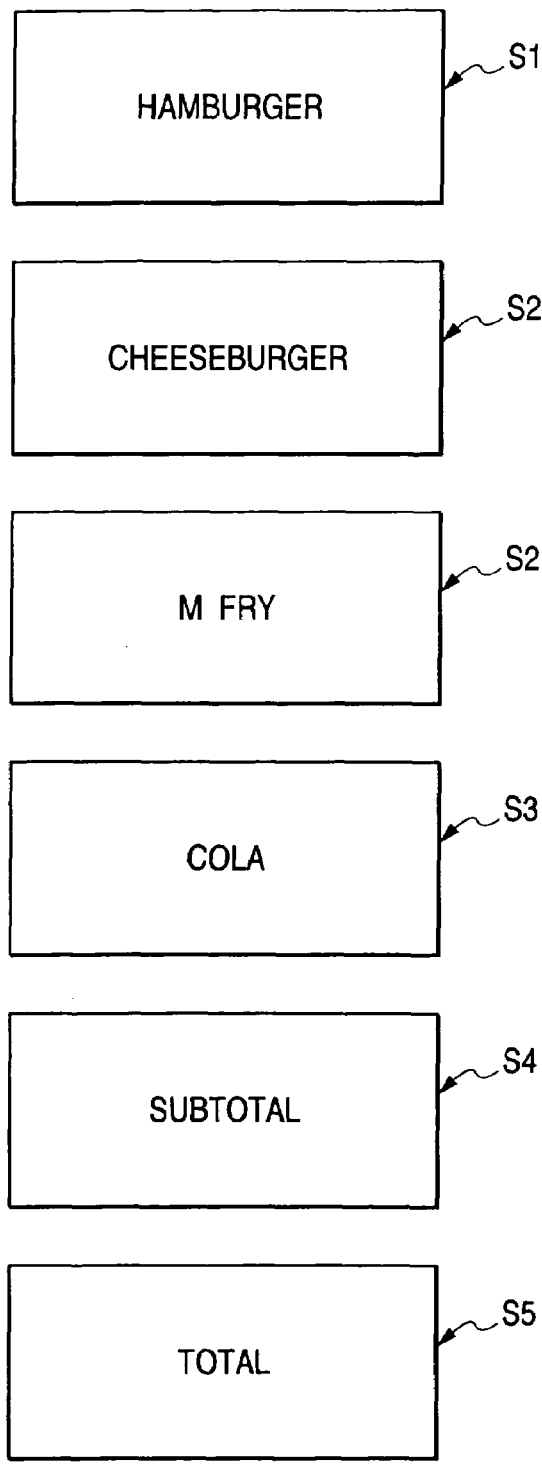
FIG. 25 depicts a flow chart of the prior art customer's order processing apparatus showing example operation of inputting orders.

In FIG. 1B, the kitchen display controller 3 includes a central processing unit (CPU) 11, a program memory 12, a data memory 13, a setting data memory 14, a display circuit 15, a switch circuit 16, a communication circuit 17, and a clock circuit 18, wherein the central processing unit 11 is coupled to other elements mentioned above through a data bus. The electronic cash registers 1a and 1b have the keyboard as similar as that of the prior art as shown in FIG. 24.

The display circuit 15 is coupled to the display monitor 2 shown in FIG. 1A. The switch circuit 16 is coupled to the monitor switch 19, the rotary switch 20, and the keyboard 4 shown in FIG. 1B. The communication circuit 17 is coupled to the electronic cash registers 1a and 1b through the communication path 6.

FIG. 2 shows an article setting table of this invention showing relations between article names and peak time zone control codes.

The article setting table is prepared by either of the cash registers 1a and 1b using the display and the keyboard thereof and transmitted to the kitchen video controller 3 in which the article setting table is stored in the setting memory 14. Alternatively, the article setting table may be prepared in the kitchen video controller 3 using the display monitor 2 and the keyboard 4.

FIG. 3 shows a display image of sets of orders on the display 1 at a slow time zone, i.e., when it is not crowded. FIG. 4 shows a display image of a list of articles to be prepared per a unit interval on the display 1 at a peak time zone.

In FIG. 3, at the slow time zone, respective sets of orders are independently displayed on the display monitor 2. On the other hand, at the peak time zone or in the peak time condition, only articles of which peak time zone control codes have been set to "one" are displayed. The numbers at column Q-5 represent the target number of respective articles to be prepared for five minutes and the numbers at column Q-10 represent the target number of respective articles to be prepared for ten minutes. For example, the image shown in FIG. 4 means that a hamburger is to be prepared every five minutes and two hamburgers are to be prepared every ten minutes.

Figure 5:
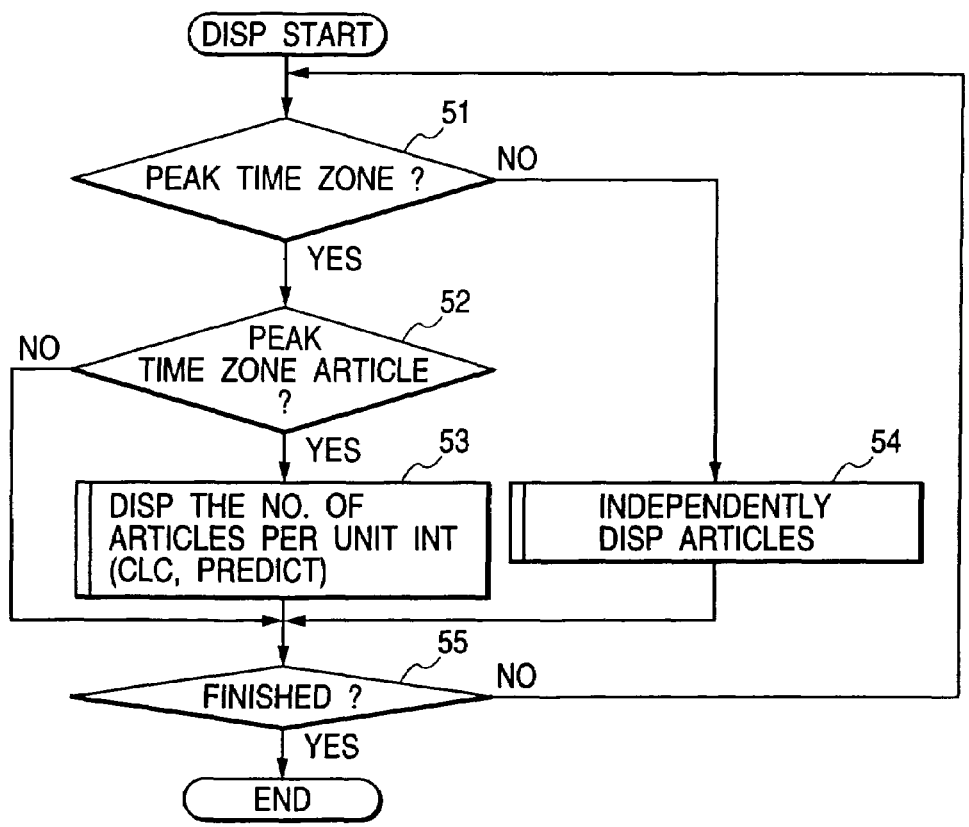
FIG. 5 depicts a flow chart of a first embodiment showing displaying operation.

FIG. 5 shows displaying operation. This program is stored in the program memory 12.

In response to a set of order(s), i.e., the total key of the electronic cash register 1a or 1b, the CPU 11 executes this program. In step 51, the CPU 11 judges whether it is within the peak time zone. For example, the peak time zone is judged from 11:00 a.m. to 1:00 p.m. by comparing the present time data from the clock circuit 18 with data of the peak time zone in the setting memory 14. If it is within the peak time zone, processing proceeds to step 52 and if it is within the slow time zone, that is, it is not within the peak time zone, processing proceeds to step 54. In step 52, the CPU 11 checks whether the peak time zone control code of "one" has been set in the article setting table with respect to the ordered article. If "one" has been set, processing proceeds to step 53 and if "one" has not been set, processing proceeds to step 55.

In step 53, the CPU 11 counts the number of orders of each article of which peak time zone control code is "one" for previous thirty minutes to calculate the number of articles to be prepared every five minutes and every ten minutes for prediction and displays the number of the articles to be prepared every five minutes and every ten minutes as shown in FIG. 4. In step 55, if all articles in the set of order have been processed, processing ends or returns to a not-shown main routine. In step 55, if all articles in the set of order have not been processed, processing returns to step 51 to process the following ordered article.

In step 54, that is, at the slow time zone, as shown in FIG. 3, the CPU 11 displays the names of ordered articles and the number of ordered articles every set of order in order of time. In step 55, if all articles in the set of order have been processed, processing ends or returns to the not-shown main routine.

As mentioned above, in the customer's order processing apparatus according to the first embodiment, the peak time zone control codes indicative of either of displaying or not displaying the predicted the number of articles to be prepared or to be sold are set in the article setting table. When it is within the peak time zone, the predicted number of articles are displayed instead the display image representing respective sets of orders. Therefore, it becomes easy to prepare articles and the efficiency of cooking can be increased. Moreover, at the slow time zone, it is possible to reduce a loss by previously preparing.

As mentioned, in the method of processing customer's orders, there are steps: (a) inputting and storing setting data for every article in the setting memory 14; (b) inputting and storing order data of ordered articles in the data memory 13; (c) predicting quantities of the ordered articles in response to a command signal generated in step 53 from the data of sold articles from the data memory 13 for last thirty minutes; and displaying the quantities for every the article in accordance with the setting data in response to the command signal in step 53. Moreover, the clock circuit 18 measures the present time; and the CPU 11 judges whether the present time is within a peak time zone to generate the command signal.

In this embodiment, it is judged whether the ordered article is the peak time zone article in step 52. However, this step can be omitted. Thus, the number of all articles ordered for previous thirty minutes are predicted in step 53.

The articles of which the peak time zone control codes have not been set may be independently displayed away from the display image shown in FIG. 4 for a surer serving.

SECOND EMBODIMENT

A customer's order processing apparatus of a second embodiment has substantially the same structure as that of the first embodiment. The difference is that the peak time zone can be set by an operator.

FIG. 6 shows a table for storing a peak time zone start time (11:00) 61 and a peak time zone end time (14:00) 62. Data of this table is inputted with the electronic cash register 1*a* or 1*b* or the keyboard 4 and stored in the setting memory 14.

FIG. 7 depicts a flow chart of the second embodiment showing displaying operation. This program is stored in the program memory 12.

In response to an order or a set of orders from either of cash registers 1*a* or 1*b*, the CPU 11 executes this program. In step 71, the CPU 11 reads the present time from the clock circuit 18. In the following step 72 checks whether it is within the peak time zone, that is, from 11:00 to 14:00 by comparing the present time data from the clock circuit 18 with data of the peak time zone start time 61 and the peak time zone end time 62 in the setting memory 14. If it is between the peak time zone start time 61 and the peak time zone end time 62, processing proceeds to step 74 and if it is within the slow time zone, that is it is not between the peak time zone start time 61 and the peak time zone end time 62, processing proceeds to step 76. In step 74, the CPU 11 checks whether the peak time zone control code of "one" has been set in the article setting table with respect to the ordered article. If "one" has been set, processing proceeds to step 75 and if "one" has not been set, processing proceeds to step 77.

In step 75, the CPU 11 counts the number of orders of each article for which peak time zone control code is "one", for previous thirty minutes to calculate the number of articles to be prepared every five minutes and every ten minutes for prediction and displays the number of the articles to be prepared every five minutes and every ten minutes as shown in FIG. 4. In step 77, if all articles in the set of order have been processed, processing ends or returns to a not-shown main routine. In step 77, if all articles in the set of order have not been processed, processing returns to step 71 to process the following ordered article.

In step 76, that is, at the slow time zone, as shown 20 in FIG. 3, the CPU 11 displays the names of ordered articles and the number of ordered articles for every set of order in order of time. In step 77, if all articles in the set of order have been processed, processing ends or returns to the not-shown main routine.

As mentioned above, in the customer's order processing apparatus according to the second embodiment, the peak time zone control codes indicative of either of displaying or not displaying the predicted the number of articles to be prepared or to be sold are set in the article setting table. When it is within the peak time zone which can be set by the operator, the predicted number of articles are displayed instead the display image representing respective sets of orders. Therefore, it becomes easy to prepare articles and the efficiency of cooking can be increased. Moreover, at the slow time zone, it is possible to reduce a loss by previously preparing.

In the method according to the second embodiment, the peak time zone data may be inputted so as to be stored.

The judging whether it is at the peak time zone is made in accordance with the inputted and stored peak time zone start time and peak time zone end time and the present time.

THIRD EMBODIMENT

A customer's order processing apparatus of a third embodiment has substantially the same structure as that of the first embodiment. The difference is that the peak time zone condition can be set by an operator with the monitor switch 19.

Figure 8:
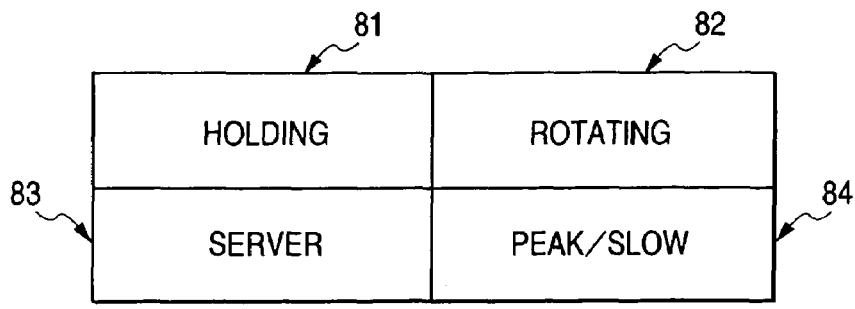
FIG. 8 is an illustration of a third embodiment showing a monitor switch.

FIG. 8 is an illustration of the third embodiment showing a monitor switch 19. The monitor switch 19 includes a holding key 81, a rotating key 82, and a served key 83, and a peak/slow setting key 84.

The CPU 11 counts the number of depressing the peak/slow key 84 using the data memory 13, so that the LSB of the count value alternately changes between one and zero, which represents peak and slow conditions.

When the video controller 3 is turned on, the CPU 11 in the video controller 3 executes display operation in the slow condition as shown in FIG. 3.

Figure 9:
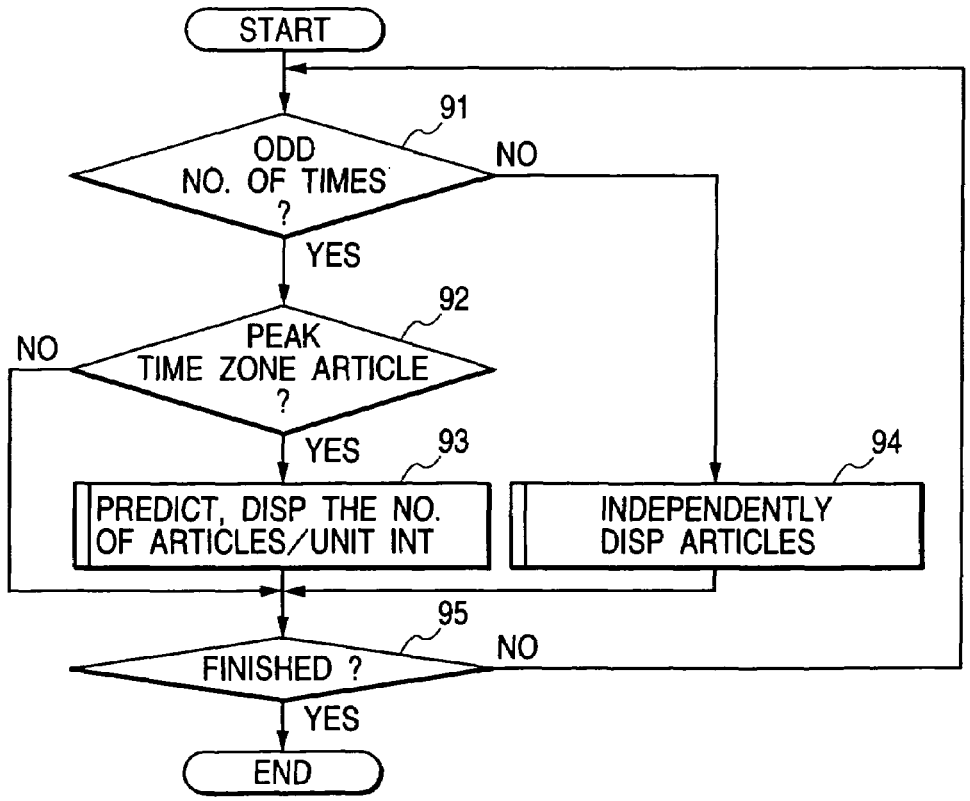
FIG. 9 depicts a flow chart of the third embodiment showing displaying operation.

FIG. 9 depicts a flow chart of the third embodiment showing displaying operation. This program is stored in the program memory 12.

In response to a set of orders (an order) from either of cash registers 1*a* or 1*b*, the CPU 11 executes this program. In step 91, the CPU 11 detects the LSB of the counts of depressing the peak/slow setting key 84 and checks whether the LSB is one or zero, that is, whether the number of depressing the peak/slow key 84 is odd times (1) or even times (0).

If the counts represents odd times (1), that is, in the peak time condition, processing proceeds to step 92 and if the counts represents even times (0), that is, in the slow time condition, processing proceeds to step 94.

If it is in the peak time condition, in step 92, the CPU 11 checks whether the peak time zone control code of "one" has been set in the article setting table with respect to the ordered article. If "one" has been set, processing proceeds to step 93 and if "one" has not been set, processing proceeds to step 95.

In step 93, the CPU 11 counts the number of orders of each articles of which peak time zone control code is "one" for previous thirty minutes to calculate the number of articles to be prepared every five minutes and every ten minutes for prediction and displays the number of the articles to be prepared every five minutes and every ten minutes as shown in FIG. 4. In step 95, if all articles in the set of order have been processed, processing ends or returns to a not-shown main routine. In step 95, if all articles in the set of order have not been processed, processing returns to step 91 to process the following ordered article.

In step 94, that is, in the slow time zone, as shown in FIG. 3, the CPU 11 displays the names of ordered articles and the number of ordered articles for every set of order in order of time. Then, in step 95, if all articles in the set of orders have been processed, processing ends or returns to the not-shown main routine.

As mentioned above, in the customer's order processing apparatus according to the third embodiment, the peak time zone control codes indicative of either of displaying or not displaying the predicted number of articles to be prepared or to be sold in the article setting table. When it is within the peak time zone which can be set by the operator with the monitor switch 19, the predicted number of articles are displayed instead the display image representing respective sets of orders. Therefore, it becomes easy to prepare articles and the efficiency of cooking can be increased. Moreover, at the slow time zone, it is possible to reduce a loss by previously preparing.

In the method according to the third embodiment, there are steps of: (a) inputting and storing setting data for every article; (b) inputting and storing order data of ordered articles; (c) predicting quantities of the ordered articles in response to a command signal; (d) displaying the quantities every the articles in accordance with the setting data in response to the command signal and (e) providing a monitor switch responsive to an operator for generating the command signal.

FOURTH EMBODIMENT

A customer's order processing apparatus of a fourth embodiment has substantially the same structure as that of the third embodiment. The difference is that the peak time zone condition can be set by an operator with the rotary switch 20.

Figure 10:
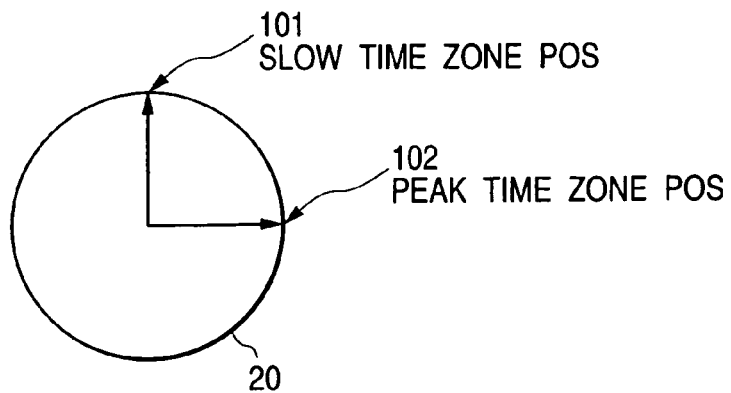
FIG. 10 is an illustration of a fourth embodiment showing the rotary switch.

FIG. 10 shows the rotary switch 20. The rotary switch 20 is coupled to the video controller 3 but arranged at the display monitor 2. Instead, the rotary switch 20 may be provided to either of the electronic cash register 1a or 1b and the command is transmitted to the video controller 3. When an operator judges that it is in the peak time condition, the operator rotates the rotary switch 20 to the peak time zone position 102 and when the operator judges that it is in the slow time condition, the operator rotates the rotary switch 20 to the slow time zone position 101.

Figure 11:
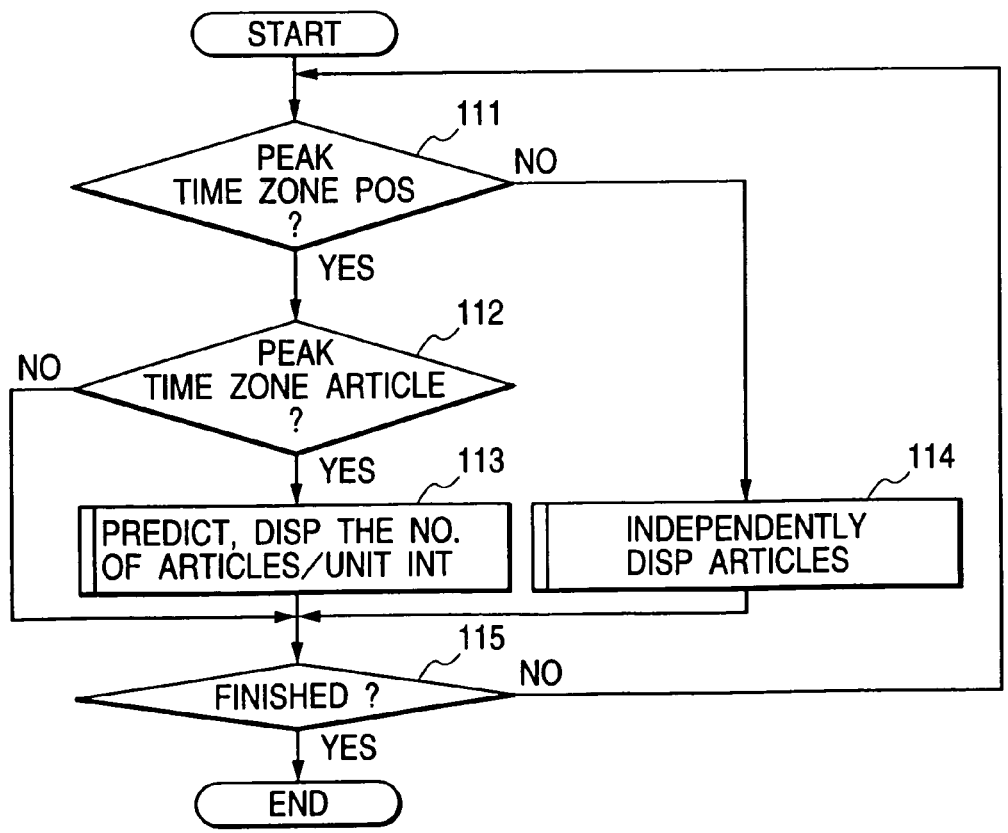
FIG. 11 depicts a flow chart of the fourth embodiment showing displaying operation.

FIG. 11 depicts a flow chart of the fourth embodiment showing displaying operation. This program is stored in the program memory 12.

In response to a set of orders from either of cash registers 1a or 1b, the CPU 11 executes this program. In step 111, the CPU 11 detects the position of the rotary switch 20 and checks whether the rotary switch 20 is at a peak time zone position 102. If the rotary switch 20 is at the peak time zone position 102, processing proceeds to step 112 and if the rotary switch 20 is not at the peak time zone position 102, i.e., at the slow time zone position 101, processing proceeds to step 114.

In step 112, the CPU 11 checks whether the peak time zone control code of "one" has been set in the article setting table with respect to the ordered article under processing. If "one" has been set, processing proceeds to step 113 and if "one" has not been set, processing proceeds to step 115.

In step 113, the CPU 11 counts the number of orders of each articles of which peak time zone control code is "one" for previous thirty minutes to calculate the number of articles to be prepared every five minutes and every ten minutes for prediction and displays the number of the articles to be prepared every five minutes and every ten minutes as shown in FIG. 4. In step 115, if all articles in the set of order have been processed, processing ends or returns to a not-shown main routine. In step 115, if all articles in the set of order have not been processed, processing returns to step 111 to process the following ordered article.

In step 114, that is, in the slow time zone, as shown in FIG. 3, the CPU 11 displays the names of ordered articles and the number of ordered articles every set of orders in order of time.

Then, in step 115, if all articles in the set of order have been processed, processing ends or returns to the not-shown main routine.

As mentioned above, in the customer's order processing apparatus according to the fourth embodiment, the peak time zone control codes indicative of either of displaying or not displaying the predicted number of articles to be prepared or to be sold in the article setting table. When an operator judges that it is in the peak time condition, the operator can set the peak time display operation with the rotary switch 20, so that the predicted number of articles are displayed instead the display image representing respective sets of orders. Therefore, it becomes easy to prepare articles and the efficiency of cooking can be increased. Moreover, at the slow time zone, it is possible to reduce a loss by previously preparing.

In the method according to the fourth embodiment, there are steps of: (a) inputting and storing setting data for every article; (b) inputting and storing order data of ordered articles; (c) predicting quantities of the ordered articles in response to a command signal; (d) displaying the quantities of every one of the articles in accordance with the setting data in response to the command signal and (e) providing the rotary switch 20 responsive to the operator for generating the command signal.

In this embodiment, the rotary switch 20 may be replaced by a key-lock rotary switch (not shown) to provide judgement of the peak time condition by an authorized person.

FIFTH EMBODIMENT

A customer's order processing apparatus of a fifth embodiment has substantially the same structure as that of the second embodiment. The difference is that the peak time zone is detected in accordance with the detected the number of customers.

Figures 12, 13:
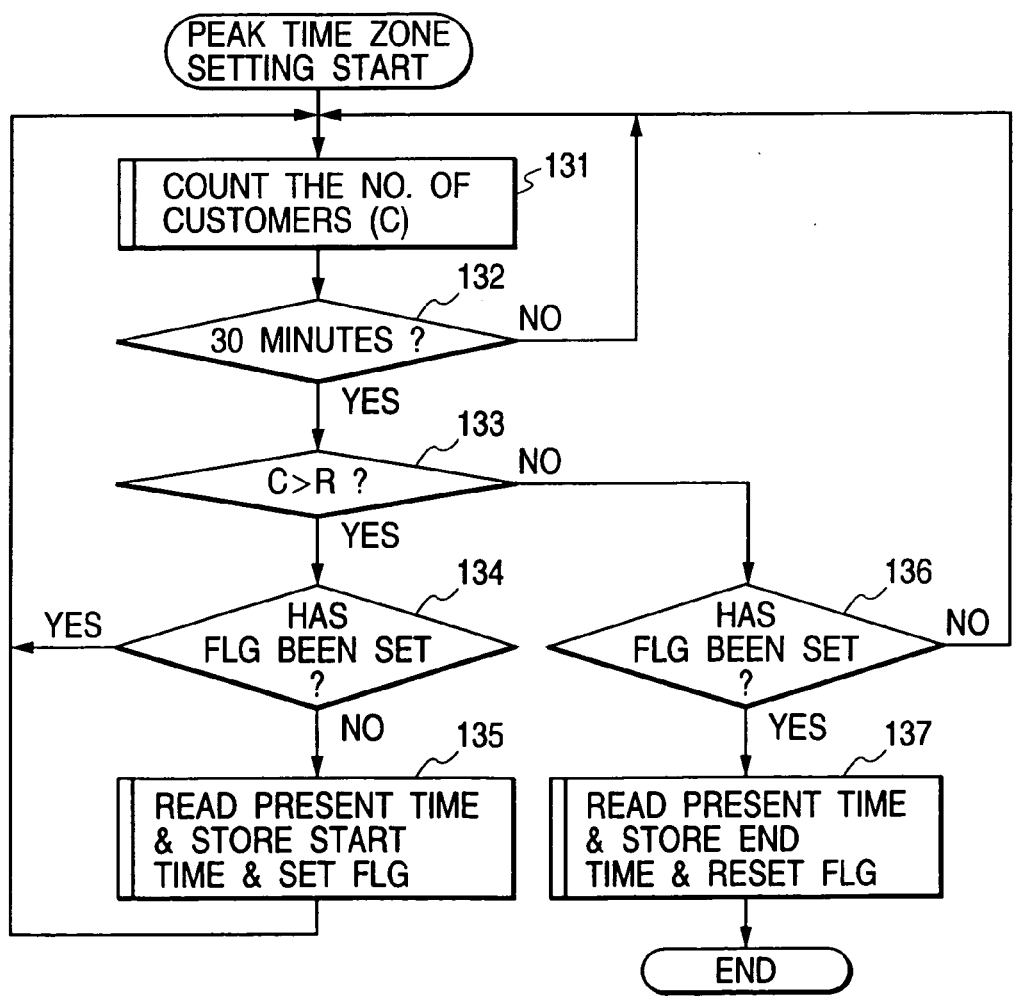
FIG. 12 is a table of a fifth embodiment showing a table for storing a reference number of customers.
FIG. 13 depicts a flow chart of the fifth embodiment showing peak time zone setting operation.

FIG. 12 is a table of the fifth embodiment showing a table for storing a peak time reference number 121 of customers for judging that it is in the peak condition. This table also stores peak time zone start time and peak time end time 122.

FIG. 13 shows peak time zone setting operation. This program is stored in the program memory 12 and executed in responses to the order and the served key 83.

In step 131, the CPU 11 counts the number of customers, that is, increments the number of customers in response to the total key and decrements the number of customers in response to the served key 83. In the following step 132, the CPU 11 checks whether thirty minutes has passed. If no, processing returns to step 131. If yes, processing proceeds to the step 133, where the CPU 11 checks whether the number of customers exceeds the reference number 121 of customers in step 133. If the number of customers exceeds the reference number (R) 121 of customers, processing proceeds to step 134 where the CPU 11 checks whether a flag indicative of a peak time zone has been set. If the flag has been set, processing returns to step 131. If no, processing proceeds to step 135 where the CPU 11 reads and sets the present time as the peak time zone start time in the table 122 and sets the flag.

In step 133, if the number of customers does not 5 exceed the reference number (R) 121 of customers, processing proceeds to step 136 where the CPU 11 checks the flag. If the flag has been set, processing proceeds to step 137 and reads and sets the present time as the peak time zone end time in the table 122 and processing ends. As a result, the peak time zone start time and end time are stored in the table 122 which represent the predicted peak time zone. The CPU 11 uses the peak time zone start time and end time similar to the second embodiment, wherein the peak time zone start time 61 and the peak time zone end time 62 shown in FIG. 6 are replaced with the predicted peak time zone 122 shown in FIG. 12.

As mentioned above, the method according the fifth embodiment, further includes the steps of: storing a predetermined number; detecting the number of customers; and predicting a peak time zone in accordance with the predetermined number and the detected number of customers, so that the command signal is generated in accordance with the predicted peak time zone data and the present time.

SIXTH EMBODIMENT

A customer's order processing apparatus of a sixth embodiment has substantially the same structure as that of the first embodiment. The difference is that the peak time zones can be independently set between weekdays and holidays.

FIG. 14 is an illustration of the sixth embodiment showing a weekday peak time zone table 141 and a holiday peak time zone table 142. The weekday peak time zone table 141 stores a peak time zone start time (11:30) and a peak time zone end time (13:30) for weekdays. The holiday peak time zone table 142 stores a peak time zone start time (11:00) and a peak time zone end time (14:30) for holidays. Data of this tables 141 and 142 is inputted with the electronic cash register 1a or 1b or the keyboard 4 and stored in the setting memory 14 from the data of sold articles data in the previous weeks.

FIG. 15 depicts a flow chart of the sixth embodiment showing displaying operation. This program is stored in the program memory 12.

In response to a set of orders from either of cash registers 1a or 1b, the CPU 11 executes this program. In step 151, the CPU 11 reads the date and time from the clock circuit 18. In the following step 152, the CPU checks whether today is a weekday or a holiday with calendar data stored in the program memory 12. If today is a weekday, processing proceeds to step 153 and if today is a holiday, processing proceeds to step 154.

In step 153, the CPU 11 reads data in the weekday table 141. In step 155, the CPU 11 checks the present time is within the peak time zone by comparing the time read in step 151 with the data in the weekday peak time zone table 141. If the present time is within the peak time zone, processing proceeds to step 157. If the present time is not within the peak time zone, processing proceeds to step 159.

In step 157, the CPU 11 checks whether the peak time zone control code of "one" has been set in the article setting table with respect to the ordered article under processing. If "one" has been set, processing proceeds to step 158 and if "one" has not been set, processing proceeds to step 160.

In step 158, the CPU 11 counts the number of orders of each articles of which peak time zone control code is "one" for previous thirty minutes to calculate the number of articles to be prepared every five minutes and every ten minutes for prediction and displays the number of the articles to be prepared every five minutes and every ten minutes as shown in FIG. 4. In step 160, if all articles in the set of orders have been processed, processing ends or returns to a not-shown main routine. If all articles in the set of orders have not been processed, processing returns to step 151 to process the following ordered article.

In step 159, that is, at the slow time zone, as shown in FIG. 3, the CPU 11 displays the names of ordered articles and the number of ordered articles for every set of order in order of time. In step 160, if all articles in the set of order have been processed, processing ends or returns to the not-shown main routine.

When today is judged as a holiday in step 152, the CPU 11 compares the time read in step 151 with the data in the holiday peak time zone table 142. If the present time is within the peak time zone, processing proceeds to step 157 and if the present time is not within the peak time zone, processing proceeds to step 159, so that the peak time zone display operation is performed at the peak time zone on the holiday or the slow time zone display operation is performed on the holiday in accordance with the present time and the data in the holiday peak time zone table 142.

As mentioned above, in the customer's order processing apparatus according to the sixth embodiment, when it is within the peak time zone which can be set by the operator with respect to weekdays and holidays, the predicted number of articles are displayed instead the display image representing respective sets of orders. Therefore, it becomes easy to prepare articles and the efficiency of cooking can be increased. Moreover, at the slow time zone, it is possible to reduce a loss by previously preparing.

As mentioned, in the sixth embodiment, there are steps of inputting and storing weekday peak time zone data and holiday peak time zone data as the peak time zone data. The command signal is generated in accordance with the stored weekday peak time zone data, the stored holiday peak time zone, and the present time.

SEVENTH EMBODIMENT

A customer's order processing apparatus of a seventh embodiment has substantially the same structure as that of the first embodiment. The difference is that the peak time condition is detected from the number of customers.

Figures 16, 17:
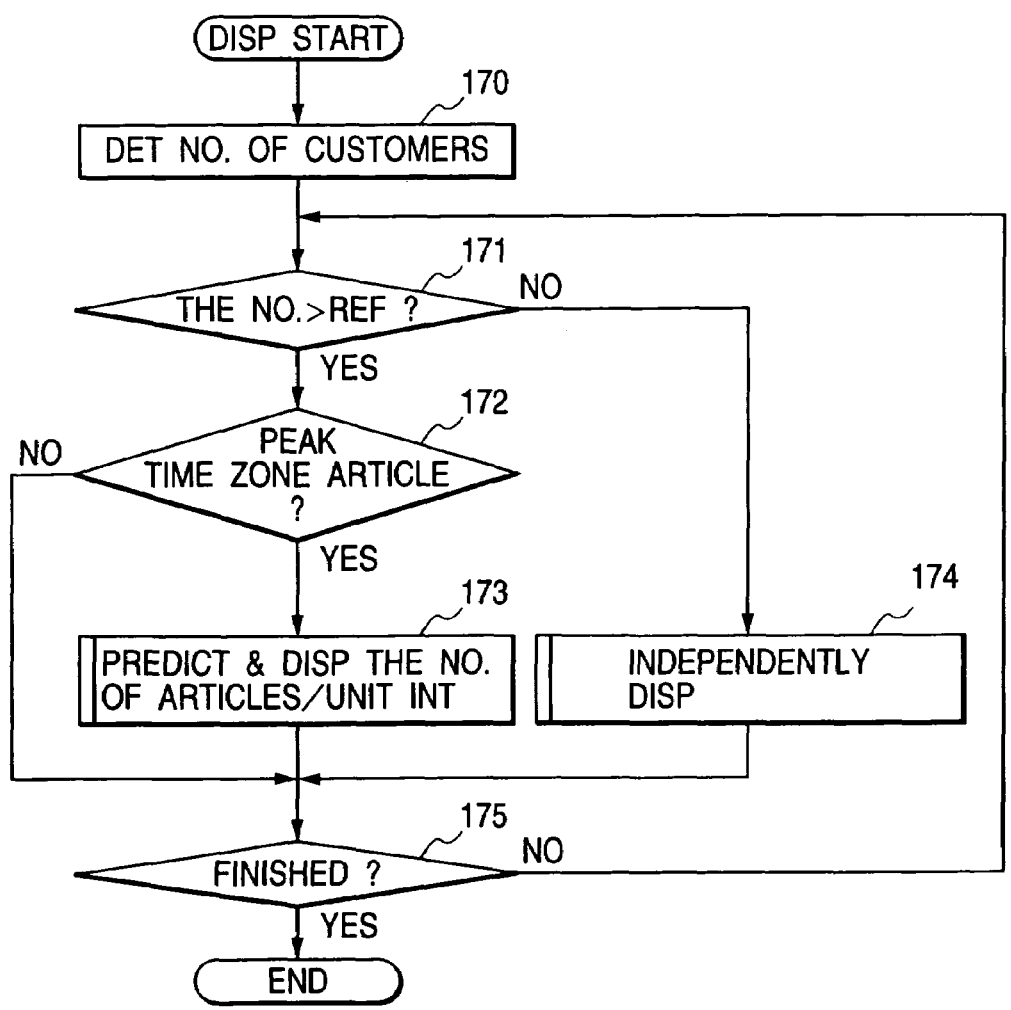
FIG. 16 is an illustration of a seventh embodiment showing a reference number of customers.
FIG. 17 depicts a flow chart of the seventh embodiment showing displaying operation.

FIG. 16 shows a reference number of customers. Data of the reference number is inputted with the electronic cash register 1a or 1b or the keyboard 4 and stored in the setting memory 14.

FIG. 17 depicts a flow chart of the seventh embodiment showing displaying operation. This program is stored in the program memory 12.

In response to a set of order(s), i.e., the total key of the electronic cash register 1a or 1b, the CPU 11 executes this program. In step 170, the CPU 11 detects the number of customers per unit interval from the data of sets of orders. In step 171, the CPU 11 compares the detected number of customers with the reference number. If the detected number exceeds the reference number, that is, in the peak time condition, processing proceeds to step 172 and if the detected number does not exceed the reference number, that is, in the slow time condition, processing proceeds to step 174. In step 172, the CPU 11 checks whether the peak time zone control code of "one" has been set in the article setting table with respect to the ordered article. If "one" has been set, processing proceeds to step 173 and if "one" has not been set, processing proceeds to step 175.

In step 173, the CPU 11 counts the number of orders of each articles of which peak time zone control code is "one" for previous thirty minutes to calculate the number of articles to be prepared every five minutes and every ten minutes for prediction and displays the number of the articles to be prepared every five minutes and every ten minutes as shown in FIG. 4. In step 175, if all articles in the set of order have been processed, for example, when the total key of the electronic cash register 1a or 1b is depressed, processing ends or returns to a not-shown main routine. In step 175, if all articles in the set of order have not been processed, processing returns to step 171 to process the following ordered article.

In step 174, that is, at the slow time zone, as shown in FIG. 3, the CPU 11 displays the names of ordered articles and the number of ordered articles every set of order in order of time. In step 175, if all articles in the set of order have been processed, processing ends or returns to the not-shown main routine.

As mentioned above, in the customer's order processing apparatus according to the seventh embodiment, when it is in the peak time condition detected by comparing the detected number of customer per unit interval with the reference number, the predicted number of articles are displayed instead the display image representing respective sets of orders. Therefore, it becomes easy to prepare articles and the efficiency of cooking can be increased. Moreover, at the slow time zone, it is possible to reduce a loss by previously preparing.

As mentioned, in the method of processing customer's orders of the seventh embodiment, there are steps of: storing a reference number; detecting the number of customers; and judging whether it is in a peak time condition in accordance with the reference number and the detected number of customers to generate the command signal when the detected number of customers exceeds the predetermined number.

EIGHTH EMBODIMENT

A customer's order processing apparatus of an eighth embodiment has substantially the same structure as that of the first embodiment. The difference is that the start and end of the peak time zone operation is commanded by the electronic cash register 1a or 1b and the CPU 11 receives the start command and the end command from the electronic cash registers 1a or 1b.

Figure 18A:
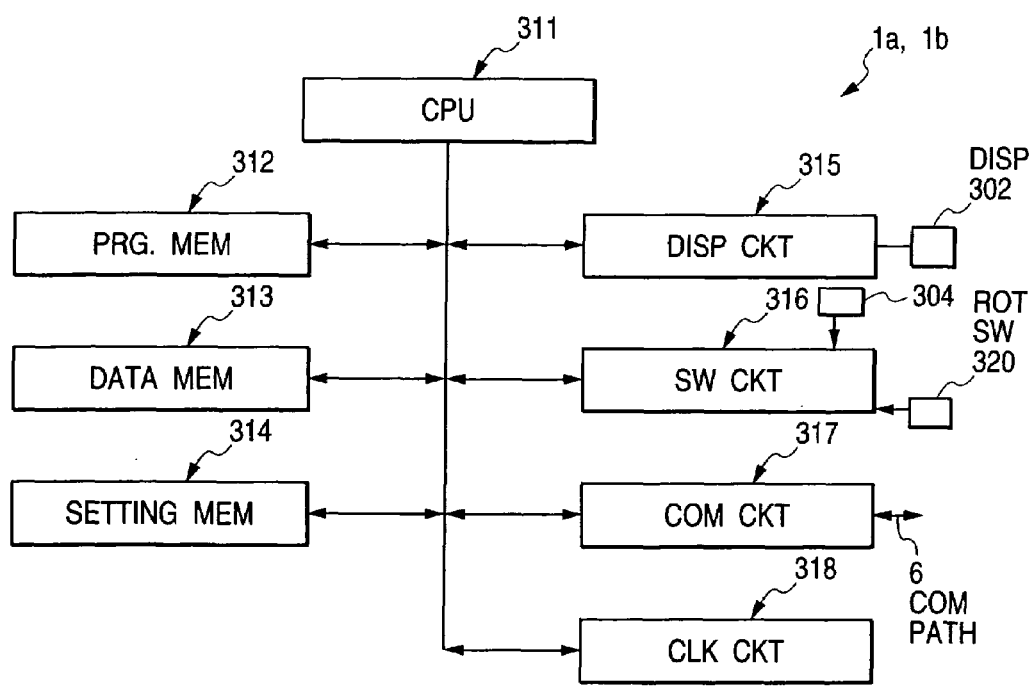
FIG. 18A is a block diagram of an eighth embodiment showing an electronic cash register.

FIG. 18A is a block diagram of the eighth embodiment showing the electronic cash register 1a or 1b.

In FIG. 18A, the electronic cash register 1a or 1b includes a CPU (central processing unit) 311, a program memory 312, a data memory 313, a setting data memory 314, a display circuit 315, a switch circuit 316, a communication circuit 317, and a clock circuit 318, wherein the CPU 311 is coupled to other elements just mentioned through a data bus.

The display circuit 315 is coupled to the display 302. A rotary switch 320 and a keyboard 304 are coupled to the switch circuit 316. The communication circuit 317 is coupled to the video controller 3 through the communication path 6.

Figure 18B:
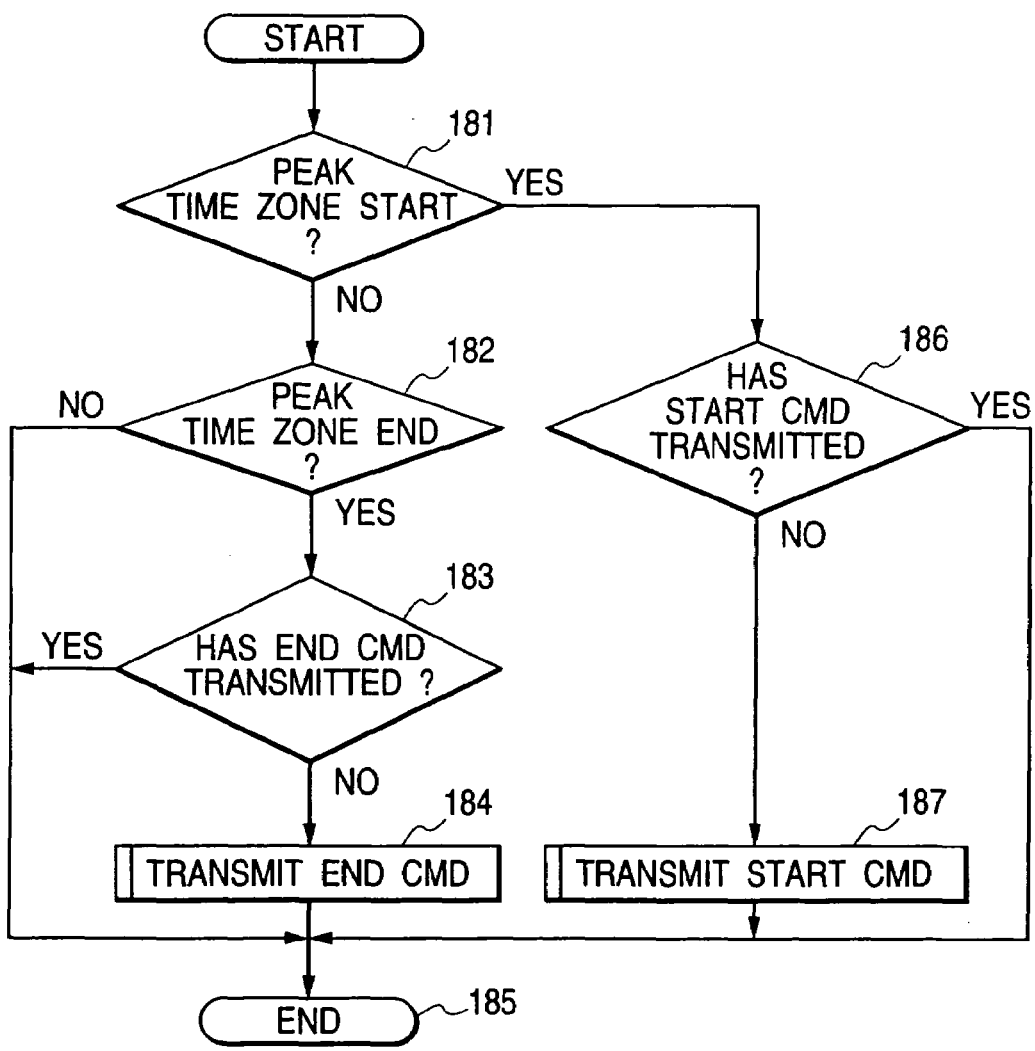
FIG. 18B depicts a flow chart of the eighth embodiment showing a command transmission operation.

FIG. 18B depicts a flow chart of the eighth embodiment showing a command transmission operation by the CPU 311.

The CPU 311 reads the present time from the clock circuit 318 and checks whether the present time agrees with the peak time zone start time in step 181. If the present time agrees with the peak time zone start time stored in the setting memory 314, the CPU 311 checks whether the start command has been transmitted in step 186. If the start command has not been transmitted, the CPU 311 transmits the start command to the video controller 3 with the communication circuit 318 through the communication path 6 in step 187. In step 186, if the start command has been transmitted, processing ends or returns to a not-shown main routine.

In step 181, if the present time disagrees with the peak time zone start time, processing proceeds to step 182 where the CPU 311 checks whether the present time agrees with the peak time zone end time stored in the setting memory 314. If the present time agrees with the peak time zone end time, the CPU 311 checks whether the end command has been transmitted in step 183. If the end command has not been transmitted, the CPU 311 transmits the end command to the video controller 3 with the communication circuit 318 through the communication path 6 in step 184. In step 183, if the start command has been transmitted, processing ends or returns to the not-shown main routine.

FIG. 19A depicts a flow chart of the eighth embodiment showing receiving operation of the video controller. In step 191, the CPU 11 checks whether the data is for orders. If the data is for orders, the CPU 11 stores the data of the orders in the data memory 13 in step 196 and processing ends. More specifically, processing returns the not-shown main routine to process the orders as embodiments mentioned above.

In step 191, if the data is not of orders, the CPU 11 checks whether the data is a start command in step 192. If the data is a start command, the CPU 11 sets a peak time zone flag in step 197 to execute the peak time zone display operation and processing ends or returns to the main routine.

In step 192, if the data is not the start command, the CPU 11 checks whether the received data is an end command in step 193. If the data is the end command, the CPU 11 resets the peak time zone flag in step 194 to execute the slow time zone display operation. In step 193, if the data is not the end command, processing ends or returns to the main routine.

FIG. 19B depicts a flow chart of the eighth embodiment showing a step to be replaced with the corresponding step in FIG. 5.

The CPU 11 executes the display operation in accordance with the flow chart shown in FIG. 5, wherein the step 51 in FIG. 5 is replaced with the step 51' in FIG. 19B.

The CPU 11 judges the peak time zone in accordance with setting of the peak time zone flag as shown in FIG. 19B and other display operations are executed in accordance with the flow chart shown in FIG. 5.

In this embodiment the judgement of starting and ending of the peak time zone is provided by comparing the present time with the peak time zone start time and with the peak time zone end time. However, the peak time zone start and the peak time end may be judged in response to the peak/slow switch 84 shown in FIG. 8 or the rotary switch 320 shown in FIG. 18A.

As mentioned above, in the method of processing customer's orders, there are further steps of inputting a command; transmitting the command; and receiving the command to generate the command signal.

The command may be made in accordance with steps of: measuring the present time; and judging whether the present time is within a peak time zone to generate the command signal to be transmitted.

NINTH EMBODIMENT

A customer's order processing apparatus of a ninth embodiment has substantially the same structure as that of the first embodiment. The difference is that the peak time zone is judged in accordance with the number of pending orders.

FIG. 20 is an illustration of the ninth embodiment showing a table for storing the number of orders in a pending condition in the peak time zone condition.

FIG. 21 is an illustration of the ninth embodiment showing the display image at the slow condition.

In FIG. 21, the display 2 displays the sets of orders in order of time and further displays the number (6) 211 of pending orders to be processed other than the sets of orders (of which order numbers are #0155 to #0118) independently displayed. That is, the total number of sets of orders is ten.

If there are considerably a lot of sets of orders to be processed, displaying at the peak time zone should be performed. Thus, in this embodiment, the number of pending orders are counted and the display operation is effected in accordance with the number of pending orders.

FIG. 22 depicts a flow chart of the ninth embodiment showing displaying operation. This program is stored in the program memory 12.

The CPU 11 increments the number of orders in response to receiving the order and decrements of the number in response to the served key 83.

In FIG. 22, the CPU 11 checks whether the number of the pending orders exceeds a pending reference number in step 221. If the number of pending orders exceeds the pending reference number, processing proceeds to step 222. If the pending order number does not exceed the pending reference number, processing proceeds to step 224 where the CPU 11 displays the sets of orders independently as shown in FIG. 21.

In step 222, that is, in the peak time condition, the CPU 11 checks whether the peak time zone control code of "one" has been set in the article setting table with respect to the ordered article. If "one" has been set, processing proceeds to step 223 and if "one" has not been set, processing proceeds to step 225.

In step 223, the CPU 11 counts the number of orders of each article for which peak time zone control code is "one" for previous thirty minutes to calculate the number of articles to be prepared every five minutes and every ten minutes for prediction and displays the number of the articles to be prepared every five minutes and every ten minutes as shown in FIG. 4. In step 225, if all articles in the set of order have been processed, processing ends or returns to a not-shown main routine. In step 225, if all articles in the set of order have not been processed, processing returns to step 221 to process the following ordered article.

In step 225, if all articles in the set of order have been processed, processing ends or returns to the not-shown main routine.

As mentioned above, in the customer's order processing apparatus according to the first embodiment, there are the further steps of: inputting and storing predetermined number; detecting the number of the ordered articles in a pending condition in response to the order data and a prepared command signal; and judging whether it is in a peak time condition in accordance with the predetermined number and the detected number of the ordered articles pending to generate the command signal when the detected number of the ordered articles pending exceeds the predetermined number.

What is claimed is:

1. A customer's order processing apparatus comprising:
   storing means for storing setting data for every article;
   inputting means for inputting ordered articles and storing order data of said ordered articles;
   predicting means for predicting quantities of said articles to be prepared in accordance with said stored order data in response to a command signal; and
   display means for displaying said quantities for said every article to be prepared at a given time period in accordance with said setting data in response to said command signal at a peak time, and for displaying respective sets of input ordered articles at non-peak times.

2. A customer's order processing apparatus as claimed in claim 1, wherein said storing means comprises setting data inputting means for inputting said setting data every article to store said inputted setting data in said storing means.

3. A customer's order processing apparatus as claimed in claim 1, further comprising:
   peak time zone data storing means for storing peak time zone data;
   detecting means for detecting the present time; and
   judging means for judging whether the present time is within a peak time zone to generate said command signal in accordance with said stored peak time zone data and said present time.

4. A customer's order processing apparatus as claimed in claim 3, wherein said peak time zone data storing means comprises peak time zone inputting means for inputting said peak time zone data.

5. A customer's order processing apparatus as claimed in claim 1, further comprising:
   a push switch responsive to an operator for generating said command signal.

6. A customer's order processing apparatus as claimed in claim 1, further comprising:
   a rotary switch for generating said command signal.

7. A customer's order processing apparatus as claimed in claim 3, further comprising:
   predetermined number storing means for storing a predetermined number;
   the-number-of-customer detecting means for detecting the number of customers from said order data; and
   peak time zone predicting means for predicting said peak time zone in accordance with the predetermined number and the detected number of customers to generate said peak time zone data to be stored in said peak time zone data storing means, wherein said judging means generates said command signal in accordance with said stored predicted peak time zone data and said present time.

8. A customer's order processing apparatus as claimed in claim 7, further comprising predetermined number inputting means for inputting said predetermined number so as to be stored in said predetermined number storing means.

9. A customer's order processing apparatus as claimed in claim 3, wherein said peak time zone data storing means stores weekday peak time zone data and holiday peak time zone data as said peak time zone data, said customer's order processing apparatus further comprising present date detecting means for detecting the present date and judging whether the present date is a weekday or a holiday, wherein said judging means generates said command signal in accordance with said stored weekday peak time zone data, said stored holiday peak time zone, said present time, and the present date.

10. A customer's order processing apparatus as claimed in claim 9, further comprising data inputting means for inputting said weekday peak time zone data and holiday peak time zone data.

11. A customer's order processing apparatus as claimed in claim 1, further comprising:
   reference number storing means for storing a reference number;
   the-number-of-customer detecting means for detecting the number of customers; and
   judging means for judging whether it is in a peak time condition in accordance with said reference number and the detected number of customers to generate said command signal when the detected number of customers exceeds said predetermined number.

12. A customer's order processing apparatus as claimed in claim 1, further comprising:
   transmitting means for transmitting said command; and
   receiving means for receiving said command to generate said command signal.

13. A customer's order processing apparatus as claimed in claim 12, further comprising:
   command inputting means for inputting said command so as to be transmitted.

14. A customer's order processing apparatus as claimed in claim 1, further comprising:
   predetermined number storing means for storing predetermined number;
   the-number-of-ordered-article detecting means for detecting the number of said ordered articles in a pending condition in response to said order data and a prepared command signal; and
   peak time condition judging means for judging whether it is in a peak time condition in accordance with said predetermined number and the detected number of said ordered articles in said pending condition to generate said command signal when the detected number of said ordered articles in said pending condition exceeds said predetermined number.

15. A customer's order processing apparatus as claimed in claim 14, further comprising inputting means for inputting said predetermined number.

16. A customer's order processing apparatus comprising:
   storing means for storing setting data for every article;
   inputting means for inputting ordered articles and storing order data of said ordered articles;
   predicting means for predicting quantities of said articles to be prepared in response to a command signal generated in accordance with said stored order data inputted for a given time period; and
   display means for displaying said quantities for every said articles in accordance with said setting data in response to said command signal.

* * * * *